Nov. 14, 1939.  A. MAURER  2,179,944
CHAIN
Filed Jan. 7, 1938
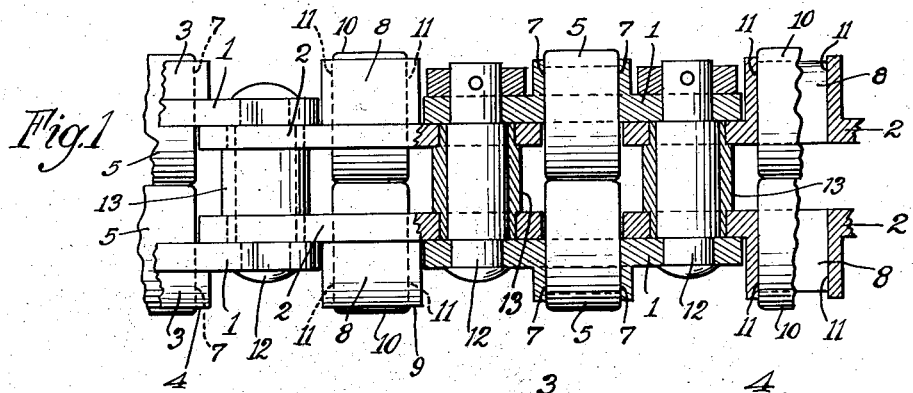
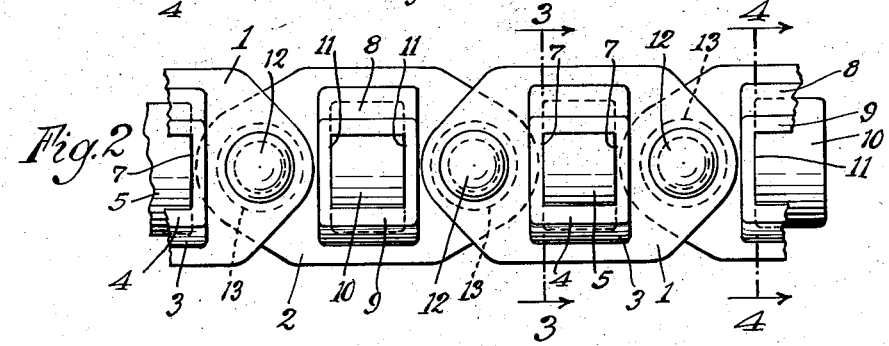
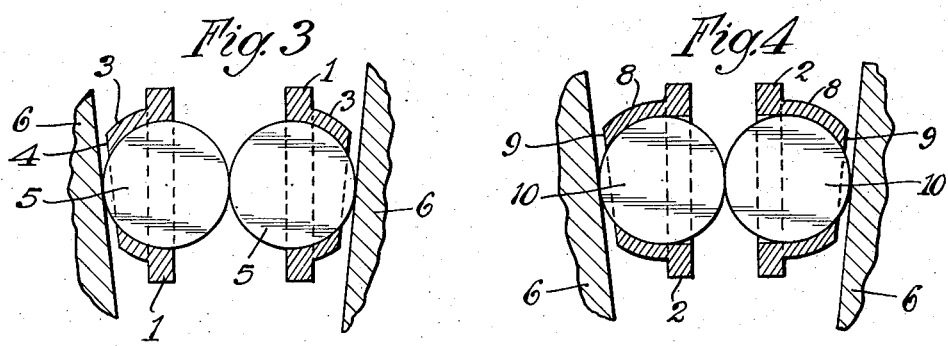
Inventor
Albrecht Maurer
by Parker + Carter
Attorneys Patented Nov. 14, 1939

2,179,944

UNITED STATES PATENT OFFICE 2,179,944

CHAIN

Albrecht Maurer, Bad Homburg vor der Hohe, Germany, assignor to Link-Belt Company, Chicago, Ill., a corporation of Illinois Application January 7, 1938, Serial No. 183,763
In Germany May 28, 1936

10 Claims. (Cl. 74—236)

This invention relates to a chain and to a transmission in which the chain is used. It has for one object to provide a chain or analogous driving elements suitable for use as a power transmission member. One application of such member is as a belt or chain engaging pairs of curved or conically faced pulleys and serving to form a driving connection from one pair of pulleys to another. Such pulleys are frequently arranged to be moved toward and from each other to alter the driving ratio.

A particular object of the invention is to provide a power transmission means for this use in which anti-friction means are provided so that when the pulleys are moved toward or from each other, the relative movement of pulley and power transmission means is rendered as nearly frictionless as possible.

Another object is to provide in connection with such a power transmission member means for supporting the anti-friction parts and for doing so without weakening of the chain members.

Another object is to provide a construction of chain links so arranged that it can receive and support for motion an anti-friction member without being itself weakened.

In the particular forms shown, the chain links, although pierced to receive anti-friction members, are actually stronger than unpierced, flat or generally flat links would be.

Other objects will appear from time to time in the course of the specification and claims.

The invention is illustrated more or less diagrammatically in the accompanying drawing, wherein:

Figure 1 is a plan view with parts in section illustrating one form of the chain;

Figure 2 is a side elevation of the chain shown in Figure 1;

Figure 3 is a transverse section taken at line 3—3 of Figure 1 illustrating a pair of outer links with anti-friction members in place; and Figure 4 is a view generally similar to Figure 3 but taken at line 4—4 of Figure 1 and illustrating a pair of inner links.

Like parts are designated by like symbols throughout the specification and drawing.

In the particular form here shown, each chain link or section comprises two link members arranged side by side and preferably spaced away from each other. Thus, an outer chain link comprises two parts 1, 1 and an inner chain link comprises two parts 2, 2.

The outer links 1, 1 are perforated and provided with cupped enlargements 3, 3 cut away as at 4 to permit a portion of an anti-friction member, in the present case a roller 5, to project outwardly and contact the face of pulley members 6, 6. As shown here, these are generally conical, but the chain might be applied to pulleys having faces of other contours. The interior of the members 3 are shaped to correspond to the anti-friction members. As will be seen in Figure 1, since the members 5 are rollers, they have flat faces and these flat faces contact flat surfaces 7 on the interior of the members 3. If balls were used instead of rollers, obviously the interiors of the members 3 would be correspondingly changed from the shape shown herewith to a shape suitable for use with balls.

While the inner links shown in Figure 4 correspond generally to the outer links shown in Figure 3, because of the fact that they are inner links, a greater depth of the portions which retain the anti-friction members is necessary. Thus, the inner links 2 are provided with hollow members 8 cut away as at 9 to permit the anti-friction members 10 to project outwardly to contact the faces of the pulleys 6. As in the case of the outer links, the inner surface of the members 9 is shaped to correspond to the rollers 10 and has flat faces 11.

The chain links may be joined in any suitable manner, but as here shown are joined by pintle pins 12 which may be positioned within bearing sleeves 13 which are in contact with the inner links 2 and may be fixed with respect to them. These sleeves are not essential, but increase the bearing surface and tend to decrease wear.

Experience has shown that by reason of the shape of the members 3 and 8 the chain link is substantially as strong as an unperforated or uninterrupted link. In some cases, the member 3 or 8 actually reinforces the link because of its shape to such an extent that tests will show that it is stronger than the unperforated or ordinary flat or relatively flat link could be.

I claim:

1. In combination in a power transmission element a plurality of links, each formed of a plurality of tension members, said tension members being provided with a perforation and an integral, outwardly bent enlargement positioned thereabout, an anti-friction member positioned in each enlargement and partially within said perforation.

2. In combination in a power transmission element a plurality of links, each formed of a plurality of tension members, said tension members being provided with an integral hollow enlargement, an anti-friction member positioned in each enlargement and projecting through said tension member and outwardly therefrom toward the outside of the link.

3. In combination in a power transmission element a plurality of links, each formed of a plurality of tension members, said tension members being provided with an integral hollow enlargement, an anti-friction member positioned in each enlargement and fitting closely therein, with a bearing fit the size and shape of the interior of said enlargement corresponding substantially to the size and shape of that portion of the anti-friction member which lies within it.

4. In combination in a power transmission element a plurality of links, each formed of a plurality of tension members, said tension members being provided with an integral hollow enlargement, an anti-friction member positioned in each enlargement, the two anti-friction members of each pair of links being in contact with each other, the shape of the interior of said enlargement corresponding substantially to the shape of that portion of the anti-friction member which lies within it.

5. In combination in a power transmission element a plurality of links, each formed of a plurality of tension members, said tension members being provided with an integral hollow enlargement, an anti-friction member positioned in each enlargement and projecting outwardly therefrom toward the outside of the link, the two anti-friction members of each pair of links being in contact with each other, the shape of the interior of said enlargement corresponding substantially to the shape of that portion of the anti-friction member which lies within it, the pairs of links being secured together in articulated relationship with adjacent links by means of pintle pins.

6. A chain link tension member having a main, generally longitudinal portion, said portion being perforated and provided with an integral hollow enlargement bounding said perforation, an anti-friction element positioned within said enlargement and extending partially out of it.

7. A chain link tension member having a main, generally longitudinal portion, said portion being perforated and provided with an integral hollow enlargement bounding said perforation, an anti-friction element positioned within said enlargement and extending partially out of it and projecting laterally beyond the chain link.

8. A chain link tension member having a main, generally longitudinal portion, said portion being perforated and provided with an integral hollow enlargement bounding said perforation and extending laterally of said chain link, an anti-friction element positioned within said enlargement and extending partially out of it and projecting laterally beyond the chain link.

9. A chain link tension member having a main, generally longitudinal portion, said portion being perforated and provided with an integral hollow enlargement bounding said perforation, an anti-friction element positioned within said enlargement and extending partially out of it, the inner surface of said enlargement being in contact with said anti-friction element and corresponding generally to it in shape throughout the area of contact.

10. A chain link tension member having a main, generally longitudinal portion, said portion being perforated intermediate its ends and provided with an integral hollow enlargement bounding said perforation and extending laterally of said chain link, an anti-friction element positioned within said enlargement and extending partially out of it and projecting laterally beyond the chain link on both sides of said link, the inner surface of said enlargement being in contact with said anti-friction element and corresponding generally to it in shape throughout the area of contact.

ALBRECHT MAURER.